(12) United States Patent
Ai

(10) Patent No.: US 7,044,877 B2
(45) Date of Patent: May 16, 2006

(54) TWO SPEED TRANSMISSION WITH SMOOTH POWER SHIFT

(75) Inventor: Xiaolan Ai, Massillon, OH (US)

(73) Assignee: The Timken Company, Canton, OH (US)

( * ) Notice: Subject to any disclaimer, the term of this patent is extended or adjusted under 35 U.S.C. 154(b) by 145 days.

(21) Appl. No.: 10/826,526

(22) Filed: Apr. 16, 2004

(65) Prior Publication Data

US 2004/0209722 A1    Oct. 21, 2004

Related U.S. Application Data

(60) Provisional application No. 60/464,312, filed on Apr. 21, 2003.

(51) Int. Cl.
*F16H 3/72*    (2006.01)
(52) U.S. Cl. .......................................................... 475/5
(58) Field of Classification Search ..................... 475/5, 475/149, 151, 152
See application file for complete search history.

(56) References Cited

U.S. PATENT DOCUMENTS 6,371,882 B1 * 4/2002 Casey et al. .................. 477/5
6,595,884 B1   7/2003 Ai et al.
6,716,126 B1 * 4/2004 Bowen ........................... 475/5
2001/0008859 A1   7/2001 Masaki

FOREIGN PATENT DOCUMENTS

| EP | 1097830 | 5/2001 |
| EP | 1097830 | 6/2004 |
| FR | 2818346 | 12/2000 |

OTHER PUBLICATIONS

International Search Report/Written Opinion—PCT/US2004/011844, Oct. 20, 2004.
International Preliminary Report—PCT/US2004/011844, Jul. 12, 2005.

* cited by examiner

*Primary Examiner*—Dirk Wright
(74) *Attorney, Agent, or Firm*—Polster, Lieder, Woodruff & Lucchesi, L.C.

(57) ABSTRACT

A two speed transmission having an input shaft and an output shaft, the two speed transmission being capable of changing the rotating speed of the output shaft from a first speed ratio to a second speed ratio, the shift between the first rotating speed ratio and the second rotating speed ratio being smoothly accomplished by the present invention's combination of two sets of planetary gear clusters and two electric motors, the electric motors being used to smooth the mechanical shift between the first speed ratio and the second speed ratio.

30 Claims, 2 Drawing Sheets

TWO SPEED TRANSMISSION WITH SMOOTH POWER SHIFT

CROSS-REFERENCE TO RELATED APPLICATIONS

This application is related to U.S. Provisional Patent Application No. 60/464,312 filed Apr. 21, 2003 from which priority to such application is claimed.

STATEMENT REGARDING FEDERALLY SPONSORED RESEARCH OR DEVELOPMENT

Not Applicable.

BACKGROUND OF THE INVENTION

Current rotorcraft (helicopter) transmission systems are designed for a single reduction ratio with the engine optimized at a single rotational speed. These transmission systems have no ability to vary the rotor speed other than changing the engine speed. In fact, recent studies have indicated that changing rotor speed using a transmission can provide significant benefits. A 15% rotor speed reduction can result in as much as 5 dB noise-reduction. In contrast, changing the rotor speed by varying the engine speed may have adverse consequences. For example, varying the engine speed impairs engine fuel efficiency and could force the engine to operate closer to the critical stall boundary speed.

Rotorcrafts and/or tilt wing crafts have two modes of operation: a hover mode and a high-speed forward flight mode. In hover mode, a high rotor speed is desirable to improve maneuverability and load factor. In the high-speed forward flight mode, a reduced rotor speed will significantly reduce the rotor noise and keep the velocity of advancing blades subsonic. Thus, in light of the above, a two-speed transmission is needed.

Various transmission concepts have been considered. These transmissions fall generally into two broad categories: those that are continuously variable transmissions (CVT) and those that are two-speed transmissions. Most CVT's were based on traction drives or friction drives where the power was transferred though non-positive engagement frictional contacts. These drives are relatively large and heavy, and their efficiency is poor. Additionally, reliability is a major concern for this type of drive.

Two-speed transmissions that generally using gears to transmit torque and power have a higher power-density and are more efficient than CVT's. However, shifting from one speed to another speed has proven to be a challenging task—particularly under high power. The shift is usually abrupt and large power changes take place abruptly within the transmission. Either of these characteristics could cause a momentary loss of output power or damage to the transmission or drive train.

SUMMARY OF THE INVENTION

The current invention relates to variable speed transmissions in general and more specifically to a two-speed transmission with a smooth powered shift. Additional features of the present invention will be in part apparent and in part pointed out hereinafter.

BRIEF DESCRIPTION OF THE SEVERAL VIEWS OF THE DRAWINGS

In the drawings, wherein like numerals and letters refer to like parts wherever they occur.

Corresponding reference characters indicate corresponding parts throughout the several views of the drawings.

While one embodiment of the present invention is illustrated in the above referenced drawings and in the following description, it is understood that the embodiment shown is merely for purpose of illustration and that various changes in construction may be resorted to in the course of manufacture in order that the present invention may be utilized to the best advantage according to circumstances which may arise, without in any way departing from the spirit and intention of the present invention, which is to be limited only in accordance with the claims contained herein.

DETAILED DESCRIPTION

Description of the Apparatus and Method

Figure 1:
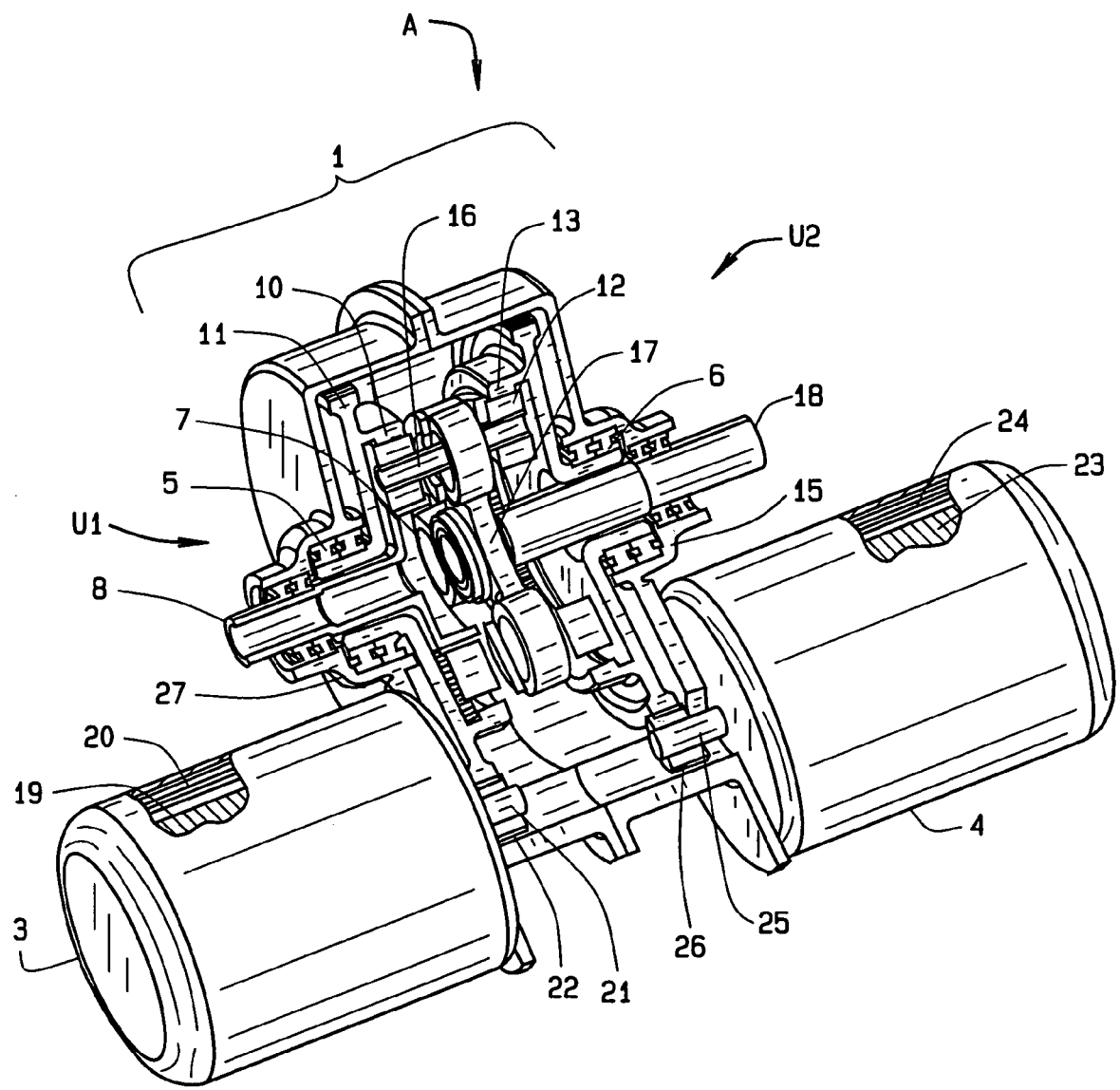
FIG. 1 is a vertical section view of one embodiment of the present invention.
Figure 2:
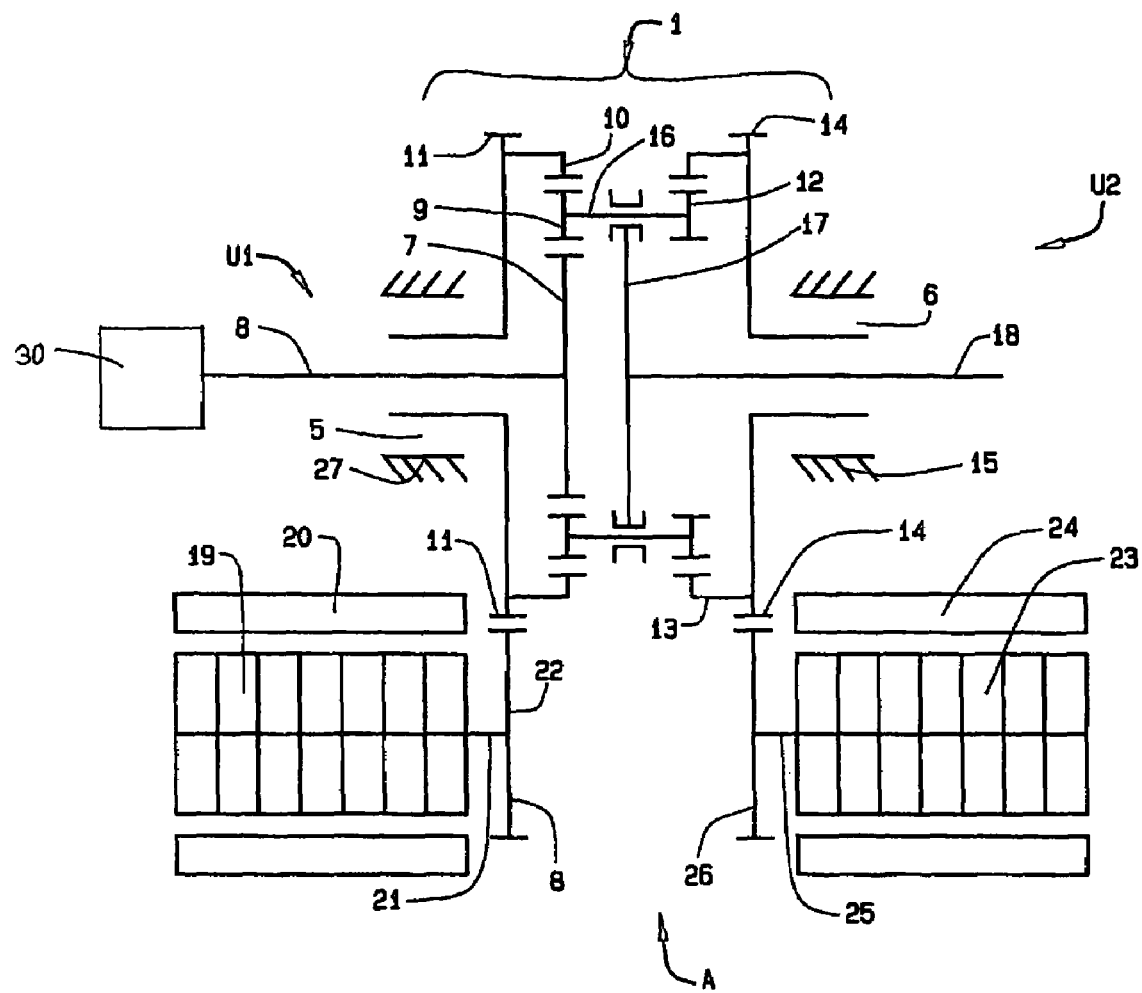
FIG. 2 is a general schematic of one embodiment of the present invention.

Referring to FIGS. 1 and 2, a two speed transmission A is shown as one embodiment of the present invention. The two speed transmission A is comprised of a compound planetary train 1 having a first planetary unit U1 and a second planetary unit U2, a first electric machine 3, a second electric machine 4, a first locking device 5, and second locking device 6.

The first planetary unit U1 comprises a first sun gear 7 that is operatively connected to an input shaft 8 which is rotated by an engine 30, a first set of planetary gears 9, and a first ring gear 10. The first ring gear 10 has a first bull gear 11 that can be selectively connected to a first fixed member 27 in the two speed transmission A and that can be held stationary by activating the first locking device 5.

The second planetary unit U2 comprises a second set of planetary gears 12 and a second ring gear 13. Like the first ring gear 10 in the first planetary unit U1, the second ring gear 13 is integrated with a second bull gear 14 that can be selectively connected to a second fixed member 15 in the two speed transmission A and that can be held stationary by activating the second locking device 6.

The first set of planetary gears 9 in the first planetary unit U1 is compounded with the second set of planetary gears 12 in the second planetary unit U2 to form a planetary cluster 16. The planetary cluster 16 is supported on a common carrier 17 which is operatively connected to an output shaft 18 that drives a lift rotor or propeller through reduction gear trains (not shown).

The first electric machine 3 comprises a first rotor 19 and a first stator 20. The first rotor 19 is connected to a shaft 21 which in turn is connected to a first pinion gear 22 at its end. The first pinion gear 22 meshes with the first bull gear 11.

The second electric machine 4 comprises a second rotor 23 and a second stator 24. The second rotor 23 is connected to a shaft 25 which in turn is connected to a second pinion gear 26 at its end. The second pinion gear 26 engages the second bull gear 14.

The two electric machines 3 and 4 are electronically connected to each other to supply or receive power to or from each other through a power control and converting unit (not shown). Each electric machine 3 and 4 may also be connected through the power control and converting unit to external power sources (not shown).

Detailed Description of the Operation

In the present embodiment, the two speed transmission A operates primarily in two modes. The first mode results in a rotating speed ratio $R_1$ between the input shaft 8 and the output shaft 18. The second mode results in a rotating speed ratio $R_2$ between the input shaft 8 and the output shaft 18. It will be appreciated that in either mode of operation in the present embodiment, there is only one mechanical path for power transmission from the input shaft to the output shaft.

In the first mode, the first ring gear 10 is grounded by engaging the first locking device 5, fixing it to a first stationary member 27 of the two speed transmission A. The second locking device 6 is disengaged, leaving the second ring gear 13 free-wheeling with the second bull gear 14. The input power received from the input shaft 8 goes through the first sun gear 7, to the first set of planetary gears 9 of the planetary cluster 16, to the common carrier 17, and then is delivered to the output shaft 18. The power is transmitted from the input shaft 8 to the output shaft 18 at the first speed ratio $R_1$.

In the second mode, the second locking device 6 is engaged, grounding the second ring gear 13 together with the second bull gear 14 to the second stationary member 15. The first locking device 5 is disengaged, freeing the first ring gear 10 and the first bull gear 11. The input power is received from the input shaft 8 and goes through the first sun gear 7, and through both sets of planetary gears 9 and 12 of the planetary cluster 16, to the common carrier 17, and then is delivered to the output shaft 18. The power is transmitted from the input shaft 8 to the output shaft 18 at the second speed ratio $R_2$.

In the first mode of operation, as the first ring gear 10 is grounded to the first fixed member 27, it provides a reaction torque to balance the differential torque between the input 8 and the output shaft 18 that are rotating at the first rotating speed ratio $R_1$. In the second mode of operation, the second ring gear 13 is grounded and provides a reaction torque to balance the differential torque between the input shaft 8 and the output shaft 18 that rotate at the second rotating speed ratio $R_2$. It is understood that in the present embodiment, the reaction torque in the two operation modes is in the same direction.

To shift from the first mode to the second mode, the first locking device 5 is released. Upon such release, a command is sent to the second electric machine 4 to provide a reaction torque to retard the rotation of the second ring gear 13. In doing so, the second electric machine 4 converts mechanical power into electrical power.

The electric power generated during the shift from the first mode to the second mode is fed through the power control and converting unit (not shown) to power the first electric machine 3 to thereby share the reaction torque which otherwise is taken solely by the second electric machine 4. The first electric machine 3 thus drives and accelerates the first bull gear 11 along with the first ring gear 10. It is understood that the first ring gear 10 rotates in an opposite direction from the rotation of the second ring gear 13. As the speed of the first electric machine 3 increases, the speed of the second electric machine 4 decreases, and the share of reaction torque shifts toward the second electric machine 4. This trend continues until the second electric machine 4 comes to a stop and reaction torque is solely taken by the second electric machine 4. This completes the shift of the two speed transmission A and the second locking device 15 is then engaged, fixing the second ring gear 13 to ground and lifting the reaction torque off the second electric machine 4. In general, shifting from the second mode into the first mode is executed by a similar process, with the exception that the above process is generally reversed.

As one can appreciate, the shift between the first mode and the second mode is substantially continuous and smooth. Additionally, the transition between the two modes is accomplished under full transmission power and with no power interruption. This substantially continuous and smooth power shift occurs because the present embodiment of the invention provides two paths for power transmission from the input shaft 8 to the output shaft 18. One is a mechanical path, the other is an electrical path and because of an operational overlap between the mechanical path and the electrical path, power variation in the mechanical path during the shifting is fully compensated by the electrical path, thereby resulting in smooth shifting between the modes. It is noted that the power transmitted through the electric path is usually a fraction of the total power.

The maximum power rating of the first and second electric machines 3 and 4 is determined by a number of factors. The most influential factor is the speed differential between the first rotating speed ratio $R_1$ and the second rotating speed ratio $R_2$. For rotorcraft, the desired differential between $R_1$ and $R_2$ is about 1.2. Therefore, the maximum power ratio for the first and second electric machines 3 and 4 is only about 5% of the maximum transmission power rating.

As can be appreciated, during normal mode of operation, one of the electric machines 3 or 4 is idling. Thus, in this or other embodiments of the present invention, the idling electric machine can be used as generator to generate electric power for onboard electronic accessories.

While the above description describes various embodiments of the present invention, it will be clear that the present invention may be otherwise easily adapted to fit any configuration where a two speed transmission with a smooth power shift is required. As various changes could be made in the above constructions without departing from the scope of the invention, it is intended that all matter contained in the above description or shown in the accompanying drawings shall be interpreted as illustrative and not in a limiting sense.

What is claimed is:

1. A two-speed transmission comprising:
   a compound planetary train having a first planetary unit and a second planetary unit, the first planetary unit having an input shaft and the second planetary unit having an output shaft; and
   a first electric machine and a second electric machine, wherein the first electric machine and the second machine are operatively connected to the compound planetary train to assist the two speed transmission from shifting between a first speed ratio $R_1$ and a second speed ratio $R_2$, wherein $R_1$ and $R_2$ are ratios between a rotating speed of the input shaft and a rotating speed of the output shaft.

2. The two speed transmission of claim 1 further comprising a first locking device and second locking device.

3. The two speed transmission of claim 2 wherein the first planetary unit includes a first sun gear that is operatively connected to the input shaft rotated by a motor, a first set of planetary gears, and a first ring gear.

4. The two speed transmission of claim 3 wherein the first ring gear has a first bull gear that can be selectively connected to a first fixed member in the two speed transmission and that can be held stationary by activating the first locking device.

5. The two speed transmission of claim 4 wherein the second planetary unit comprises a second set of planetary gears and a second ring gear, the second ring gear being integrated with a second bull gear that can be selectively connected to a second fixed member in the two speed transmission and that can be held stationary by activating the second locking device.

6. The two speed transmission of claim 5 wherein the first set of planetary gears in the first planetary unit is compounded with the second set of planetary gears in the second planetary unit to form a planetary cluster.

7. The two speed transmission of claim 6 wherein the planetary cluster is supported on a common carrier which is operatively connected to an output shaft.

8. The two speed transmission of claim 7 wherein, the first electric machine comprises a first rotor and a first stator, wherein the first rotor is connected to a shaft which in turn is connected to a first pinion gear, the first pinion gear meshing with the first bull gear.

9. The two speed transmission of claim 8 wherein the second electric machine comprises a second rotor and second stator, wherein the second rotor is connected to a shaft which in turn is connected to a second pinion gear, the second pinion gear meshing with the second bull gear.

10. The two speed transmission of claim 9 wherein the two electric machines and are electronically connected to each other either to supply or receive power to or from each other through a power control and converting unit.

11. The two speed transmission of claim 9 wherein each electric machine and is connected through the power control and converting unit to external power sources.

12. The two speed transmission of claim 11 wherein the two speed transmission operates primarily in two modes, the first mode resulting in the rotating speed ratio $R_1$ between the input shaft and the output shaft, and the second mode resulting in the rotating speed ratio $R_2$ between the input shaft and the output shaft.

13. The two speed transmission of claim 12 wherein in the first mode, the first ring gear is grounded by engaging the first locking device, fixing it to a first stationary member of the two speed transmission, wherein the second locking device is disengaged, leaving the second ring gear freewheeling with the second bull gear, the input power received from the input shaft being transmitted to the first sun gear, then to the first set of planetary gears of the planetary cluster, then through the common carrier, and is then delivered to the output shaft, and wherein the input power is transmitted from the input shaft to the output shaft at the first speed ratio $R_1$.

14. The two speed transmission of claim 13 wherein in the second mode, the second locking device is engaged, grounding the second ring gear together with the second bull gear to the second stationary member, wherein the first locking device is disengaged, freeing the first ring gear and the first bull gear, wherein the input power is received from the input shaft and goes through the first sun gear, and through both sets of planetary gears of the planetary cluster, to the common carrier, and then is delivered to the output shaft, and wherein the input power is transmitted from the input shaft to the output shaft at the second speed ratio $R_2$.

15. The two speed transmission of claim 14 wherein, in the first mode of operation, as the first ring gear is grounded to the first stationary member, it provides a reaction torque to balance the differential torque between the input shaft and the output shaft that are rotating at the first rotating speed ratio $R_1$.

16. The two speed transmission of claim 15 wherein, in the second mode of operation, the second ring gear is grounded and provides a reaction torque to balance the differential torque between the input shaft and the output shaft that rotate at the second rotating speed ratio $R_2$.

17. The two speed transmission of claim 16 wherein, while shifting from the first mode to the second mode, the first locking device is released, wherein upon such release a command is sent to the second electric machine to provide a reaction torque that tends to retard the rotation of the second ring gear along with the second bull gear such that the second electric machine generates electric power.

18. The two speed transmission of claim 17 wherein the electric power generated during the shift from the first mode to the second mode is fed through the power control and converting unit to power the first electric machine to thereby share the reaction torque which otherwise is taken by the first electric machine, such that as the speed of the second electric machine decreases, the speed of the first electric machine increases and the share of reaction torque shifts toward the second electric machine until the second electric machine comes to a stop and reaction torque is solely taken by the second electric machine after which the second locking device is then engaged, fixing the second ring gear to ground and lifting the reaction torque off the second electric machine thereby completing a shift of the two speed transmission from the first mode to the second mode.

19. The two speed transmission of claim 18 wherein shifting from the second mode into the first mode is executed when the above process is generally reversed.

20. The two speed transmission of claim 19 wherein the maximum power rating of the first electric machine and the second electric machine is generally determined by a speed ratio span between the first rotating speed ratio $R_1$ and the second rotating speed ratio $R_2$.

21. The two speed transmission of claim 20 wherein for rotorcraft, the desired speed ratio span between $R_1$ and $R_2$ is about 1.2 and the maximum power required for the first and second electric machines is about 5% of a maximum transmission power rating.

22. The two speed transmission of claim 21 wherein during operation of the two speed transmission, one of either the first electric machine or the second electric machine is idling and can generate electric power.

23. The process of manufacturing a two speed transmission comprising the steps of:
  manufacturing a two-speed transmission comprising:
    a compound planetary train having a first planetary unit and a second planetary unit, the first planetary unit having an input shaft and the second planetary unit having an output shaft; and
    a first electric machine and a second electric machine, wherein the first electric machine and the second machine are operatively connected to the compound planetary train to assist the two speed transmission from shifting between a first speed ratio $R_1$ and a second speed ratio $R_2$, wherein $R_1$ and $R_2$ are ratios between a rotating speed of the input shaft and a rotating speed of the output shaft;
  assembling the two speed transmission such that the two speed transmission operates primarily in two modes, the first mode resulting in a rotating speed ratio $R_1$ between the input shaft and the output shaft, and the second mode resulting in a rotating speed ratio $R_2$ between the input shaft and the output shaft.

24. The process of claim 23 wherein in the first mode, a first ring gear is grounded by engaging a first locking device, fixing it to a first stationary member of the two speed transmission, a second locking device is disengaged, leaving the second ring gear free-wheeling with a second bull gear, wherein the input power received from the input shaft is transferred to a first sun gear, then to a first set of planetary gears of a planetary cluster, then through a common carrier, and is then delivered to the output shaft, and wherein input power is transmitted from the input shaft to the output shaft at the first speed ratio $R_1$.

25. The process of claim 24 wherein in the second mode, a second locking device is engaged, grounding the second ring gear together with the second bull gear to the second stationary member, wherein the first locking device is disengaged, freeing the first ring gear and the first bull gear, wherein the input power is received from the input shaft and goes through the first sun gear, and through two sets of planetary gears and of the planetary cluster, to the common carrier, and then is delivered to the output shaft, and wherein the input power is transmitted from the input shaft to the output shaft at the second speed ratio $R_2$.

26. The process of claim 25 wherein in the first mode, as the first ring gear is grounded to the first stationary member, it provides a reaction torque to balance a differential torque between the input shaft and the output shaft that are rotating at the first rotating speed ratio $R_1$.

27. The process of claim 26 wherein in the second mode of operation, a second ring gear is grounded and provides a reaction torque to balance the differential torque between the input shaft and the output shaft that rotate at the second rotating speed ratio $R_2$.

28. The process of claim 27 wherein, while shifting from the first mode to the second mode, the first locking device is released, wherein upon such release, a command is sent to the second electric machine to provide a reaction torque to retard the rotation of the second ring gear such that the second electric machine converts mechanical power into electrical power, and wherein the electric power generated during the shift from the first mode to the second mode is fed through the power control and converting unit to power the first electric machine to thereby share the reaction torque which otherwise is taken by the second electric machine, wherein the first electric machine drives the first bull gear along with the first ring gear and the first ring gear rotates in an opposite direction as the second ring gear such that as speed of the first electric machine increases, the speed of the second electric machine decreases and the share of reaction torque shifts toward the second electric machine until the second electric machine comes to a stop and reaction torque is solely taken by the second electric machine and the second locking device is then engaged, fixing the second ring gear to ground and lifting the reaction torque off the second electric machine thereby completing a shift of the two speed transmission from the first mode to the second mode.

29. The process of claim 28 wherein shifting from the second mode into the first mode is executed when the above process is generally reversed.

30. A two speed transmission comprising:
means for accepting a rotary input from a motor;
means for transmitting the rotary input from the means for accepting the rotary input to a means for generating a rotary output having a rotating speed ratio of one of either $R_1$ or $R_2$; and
means for changing the rotary output from a rotating speed ratio of $R_1$ to $R_2$, and from $R_2$ to $R_1$, the means for changing the rotary output having means to shift form $R_1$ to $R_2$ and from $R_2$ to $R_1$.

* * * * *